United States Patent [19]

Rumpp et al.

[11] 4,453,032

[45] Jun. 5, 1984

[54] ELASTIC ELECTRICAL INSULATING MATERIAL COVER FOR THE CABLE IN THE HANDLE OF A MANUALLY OPERATED ELECTRICAL APPLIANCE

[75] Inventors: Gerhard Rumpp, Inning; Werner Theissig, Munich, both of Fed. Rep. of Germany

[73] Assignee: Hilti Aktiengesellschaft, Fürstentum, Liechtenstein

[21] Appl. No.: 364,883

[22] Filed: Apr. 2, 1982

[30] Foreign Application Priority Data

Apr. 13, 1981 [DE] Fed. Rep. of Germany ....... 3114870

[51] Int. Cl.$^3$ ...................... H02K 11/00; B25D 17/04; H01H 9/06; H01R 4/70

[52] U.S. Cl. ...................................... 174/46; 173/170; 200/157; 310/50

[58] Field of Search ............... 174/5 R, 46; 15/143 A, 15/361, 410, DIG. 10; 173/170, 171; 200/61.85, 157, 304; 310/50, 68 A; 339/58, 116 R, 116 C; 408/241 R, 710

[56] References Cited

U.S. PATENT DOCUMENTS

| | | | |
|---|---|---|---|
| 2,098,077 | 11/1937 | White | 15/DIG. 10 X |
| 2,272,164 | 2/1942 | Neil et al. | 200/157 |
| 2,503,226 | 4/1950 | Turner et al. | 200/157 |
| 3,269,466 | 8/1966 | Mitchell | 173/93.6 |

FOREIGN PATENT DOCUMENTS

| | | | |
|---|---|---|---|
| 739226 | 10/1955 | United Kingdom | 200/157 |

*Primary Examiner*—Laramie E. Askin
*Attorney, Agent, or Firm*—Toren, McGeady and Stanger

[57] ABSTRACT

In a manually operated electrical appliance, such as a hand drill or the like, a handle is secured to and extends from the appliance housing. Electrical components including contacts are located inside the handle, an electrical cable extends into the handle and is connected to the contacts. An elastic electrical insulating material cover is located within the handle enclosing the cable and covering the electric contacts and insulating both from the handle.

1 Claim, 1 Drawing Figure

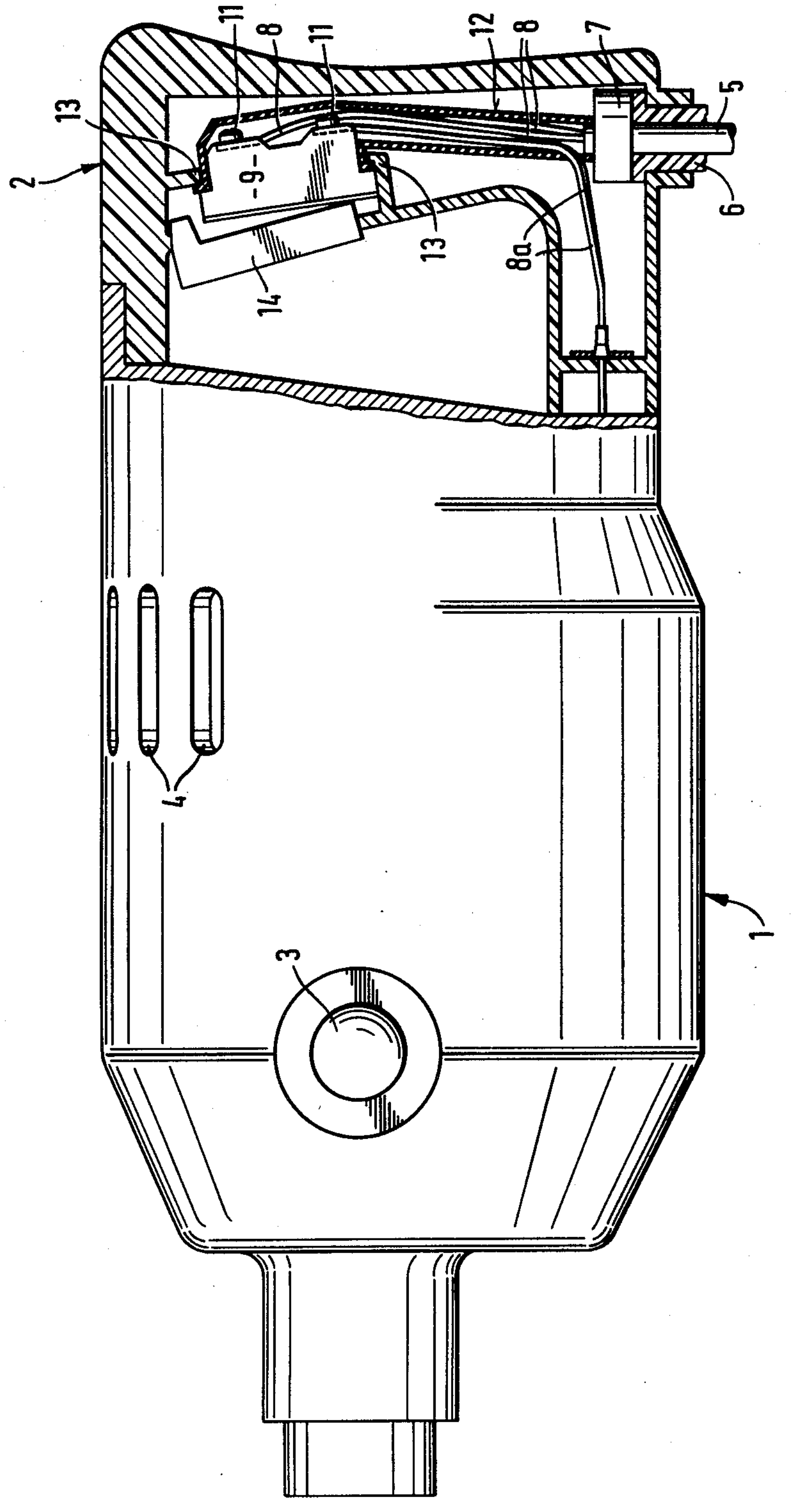
1
2
3
4
5
6
7
8
8
8
8a
-9-
11
11
12
13
13
14

ELASTIC ELECTRICAL INSULATING MATERIAL COVER FOR THE CABLE IN THE HANDLE OF A MANUALLY OPERATED ELECTRICAL APPLIANCE

SUMMARY OF THE INVENTION

The present invention is directed to a manually operated electrical appliance, such as a drill or the like, and includes a handle extending outwardly from the appliance housing with electrical components and contacts positioned within the handle.

In a number of manually operated electrical applicances, a handle projects rearwardly from the appliance housing. Current is supplied into the handle usually by way of a power cable and the ends of the cable are fixed within the handle. The individual strands of the power cable are insulated and are connected within the handle to electrical components, such as switches, distribution blocks and the like and are electrically connected to them by contacts. Other wires or strands making up the electrical connection are connected to components within the handle.

Primarily for reasons of weight and insulation, the handle, in most cases, is made of a plastic material. Accordingly, it is assured that any possible contact between an exposed strand or contact within the handle and the wall of the handle cannot result in a shock to the operator. When such manually operated appliances are used, especially under the rough use experienced at construction sites, they are exposed to undue pressure or impact stresses which can lead to the handle being broken. Such damage is also likely if the appliance is dropped on the ground. If the handle is broken or shattered it no longer affords adequate insulation from the electrical connection contacts and when an operator grasps the handle of the device he is likely to be exposed to considerable hazards.

The primary object of the present invention is to provide a manually operated electrical appliance which assures reliable insulation even if the handle is broken.

In accordance with the present invention, a cover is provided within the handle, formed of elastic electrical insulating material which encloses and insulates at least the connection contacts of the electrical components from the handle. A cover, such as an elastic rubber-like electrical insulating material can be provided affording a cover over the contacts on the electrical components and the current-conducting parts, that is the electrical cable, so that a reliable insulation is effected between the electrical conducting parts and the inside surface of the handle. Therefore, the cover provides effective protection for the operator against electrical shock if the handle should break. Due to its elasticity, the cover is able to withstand deformation, which would occur when the handle breaks, without any damage being experienced by the cover.

It is preferable if the cover is formed as an inner liner located within the handle. If a hose-shaped cover is employed, there is the advantage that it holds the ends of the electrical cable together and encloses the connection contacts and, in addition, forms a closure over the electrical components. If the handle should break, the individual parts of the electrical components or the individual strands of the electrical cable can not tear loose. The hose-shaped cover can be seamless or it can be formed by overlapping two ends or edges. If the ends or edges are overlapped, they can be joined together by interengaging button means, a zipper-like holder or by an adhesive.

In one embodiment of the invention, the end of the covering can be secured to the handle. In this way, the cover is held against any possible displacement and retains its proper functional position. In addition to or instead of such an arrangement, it is also possible to secure the cover to a component within the handle such as by sliding it over the component.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing

A manually operated electrical appliance is illustrated in side view and partially in section.

DETAILED DESCRIPTION OF THE INVENTION

As shown in the drawing a manually operated electrical appliance includes a housing 1 with a handle 2 defining a hollow space and connected to and extending from one end of the housing.

A side handle 3 extends laterally from the housing 1 forwardly of the handle 2 and the housing is provided with a number of ventilation slits or openings 4.

A power cable 5 extends into the hollow space at the lower end of the handle through a bushing 6 secured in an opening through the handle. Within the handle, a retaining ring 7 encircles the power cable and holds it within the interior of the handle 2. The cable 5 has a number of individual strands 8 extending from the ring 7 to an electrical component 9, such as an electrical switch. The strands 8 are electrically connected to contacts 11 on the component 9. Additional strands **8*a* extend from the component 9** into the interior of the electrical appliance.

Within the hollow space in the handle an elastic cover 12 formed of an electrical insulating material encloses the strands 8, **8*a*, the electrical contacts 11, and a portion of the component 9. One end of the cover 12 is secured to reinforcing ribs 13 extending inwardly from the handle wall. The other end of the cover 12 abuts the retaining ring 7. In this way, it is possible to ensure that the cover 12 does not shift within the handle 2**.

A trigger 14 mounted in and accessible on the outside of the handle, serves to switch the electrical appliance on and off and, accordingly, acts on the component 9.

While specific embodiments of the invention have been shown and described in detail to illustrate the application of the inventive principles, it will be understood that the invention may be embodied otherwise without departing from such principles.

We claim:

1. A manually operated electrical appliance, such as a hand-held drill or the like, comprising a housing, a handle projecting from said housing and forming an enclosed hollow space, an electrical component including electrical contacts located within the hollow space in said handle, an electrical cable extending through an opening in said handle into the hollow space in said handle and connected to said electrical contacts therein, wherein the improvement comprises an elastic electrical insulating material cover in the shape of a hose-like member located within the hollow space in said handle and said hose-like member having a first end and a second end and completely enclosing and insulating said electrical cable and said electrical contacts within the hollow space in said handle, a bushing positioned within said opening and extending into the hollow space in said handle for holding said cable as it passes through said opening into said handle, a retaining ring located at the end of said bushing within said handle and said retaining ring encircling and holding said cable, said retaining ring being spaced from said electrical component, ribs extending inwardly from the inside surface of said handle spaced from said opening and located around said electrical component, and the first end of said hose-like member being secured between said ribs and said electrical component and the second end of said hose-like member abutting said retaining ring.

* * * * *